US012236926B2

(12) United States Patent
Morsy et al.

(10) Patent No.: US 12,236,926 B2
(45) Date of Patent: Feb. 25, 2025

(54) SYSTEM FOR SELECTION AND PLAYBACK OF SONG VERSIONS FROM VINYL TYPE CONTROL INTERFACES

(71) Applicant: ALGORIDDIM GMBH, Munich (DE)

(72) Inventors: Kariem Morsy, Munich (DE); Hendrik Nöller, Munich (DE); Angelo Tun, Berlin (DE); Christoph Teschner, Munich (DE)

(73) Assignee: ALGORIDDIM GMBH, Munich (DE)

( * ) Notice: Subject to any disclaimer, the term of this patent is extended or adjusted under 35 U.S.C. 154(b) by 158 days.

(21) Appl. No.: 17/729,598

(22) Filed: Apr. 26, 2022

(65) Prior Publication Data

US 2023/0343314 A1 Oct. 26, 2023

(51) Int. Cl.

| | |
|---|---|
| ***G11B 25/00*** | (2006.01) |
| ***G06F 3/16*** | (2006.01) |
| ***G10H 1/00*** | (2006.01) |
| ***G11B 17/02*** | (2006.01) |

(52) U.S. Cl.

CPC ......... *G10H 1/0091* (2013.01); *G10H 1/0025* (2013.01); *G10H 2210/241* (2013.01); *G10H 2220/101* (2013.01); *G10H 2250/311* (2013.01)

(58) Field of Classification Search

CPC ....... G11B 5/09; G11B 7/085; G11B 17/0282; G11B 25/00; G10L 25/81; G10L 15/16; G10L 21/10; G06N 3/08; G06N 5/046; G06F 3/165; G06F 3/04883; G06F 16/632; G10H 1/0091; G10H 1/0025; G10H 2210/241; G10H 2250/311; G10H 2220/101; B29L 2017/001; G01H 1/0008

USPC ............................................... 369/100, 272.1

See application file for complete search history.

(56) References Cited

U.S. PATENT DOCUMENTS

| | | | | |
|---|---|---|---|---|
| 7,012,184 B2 | 3/2006 | Bastian | | |
| 10,887,033 B1 * | 1/2021 | Tessmann | ............ | G10H 1/0008 |
| 2020/0043518 A1 * | 2/2020 | Jansson | .................. | G06N 3/045 |

FOREIGN PATENT DOCUMENTS

| | | | | |
|---|---|---|---|---|
| WO | 2021175455 A1 | 9/2021 | | |
| WO | WO2021175455 * | 9/2021 | ........... | G10L 21/028 |

* cited by examiner

*Primary Examiner* — Nabil Z Hindi

(74) *Attorney, Agent, or Firm* — Kilpatrick Townsend & Stockton LLP

(57) ABSTRACT

A system for processing digital audio signals. The system includes a digital audio unit configured to provide digital audio data of a first audio track and a second audio track. The first audio track and a second audio track represent different versions of the same piece of music. The system also includes a user control device operable by a user to allow the user to select either a first region or a second region. The digital audio unit is configured to play back audio signals obtained from the first audio track when the first region is selected, and to play back audio signals obtained from the second audio track when the second region is selected.

22 Claims, 6 Drawing Sheets

SYSTEM FOR SELECTION AND PLAYBACK OF SONG VERSIONS FROM VINYL TYPE CONTROL INTERFACES

TECHNICAL FIELD

The present invention relates to a system for processing digital audio signals and, in some embodiments, a vinyl-type record having an inscribed, modulated groove, which stores signals.

BACKGROUND

Systems capable of processing different audio tracks representing different versions of one and the same piece of music are conventionally known, for example as digital music players, which allow loading a digital audio file from a storage device or from a remote network, and playback of a piece of music contained in the digital audio file through speakers or headphones. Many conventional systems offer audio effects such as equalizers, reverb and delay effects, loop or repeat effects, etc. which allow play-back of different versions of the same piece of music, i.e. versions which the user recognizes as belonging to the same piece of music but which are audibly different from one another. In addition, recent developments in audio processing allow decomposition of digital audio data into different components corresponding to different musical timbres, such as to obtain versions of the piece of music that include only some but not all of the timbres included in the original piece of music, for example versions containing only a vocal component of the piece of music or versions containing only an instrumental component (without the vocal component) of the piece of music. A system for decomposing mixed audio data is disclosed in WO 2021/175455 A1, for example.

Choosing audio effects or selecting decomposed tracks for creating a desired version of the piece of music can be a complex task. Usually, such systems involve a computer running an audio software, which needs to be operated by the user through suitable input means, such as a mouse or a touchscreen. Other conventional systems may include a hardware controller, such as a DJ controller or similar audio equipment, which may require operation of multiple buttons, sliders, etc. If the playback of a piece of music is part of a live performance, for example in case of a DJ performance, then creating and selecting multiple versions of the same piece of music can be particularly challenging as the DJ has additional tasks and responsibilities, such as selecting music according to the mood of the audience, performing seamless transitions between different pieces of music for uninterrupted music and augment music using effects and other advanced techniques for maximum dramatic impact.

Therefore, many users, in particular DJs, appreciate long-established straight-forward controllers and interfaces such as traditional vinyl records and traditional turntables providing hands-on and intuitive operating functions for switching between different pieces of music, changing the playback position within a piece of music, changing playback speed or direction, or creating scratch effects. DJs have learned and practiced their art using vinyl records on turntables for many years and gained high skills and routine on operating such systems. On the other hand, conventional vinyl records come with a number of disadvantages as compared to digital music, for example the limited availability of the desired music on vinyl record, high transportation and storage effort, degradation of sound quality due to prolonged use and physical stress, or possible interference due to vibration disturbing the pickup system, in particular skipping of the needle and thereby interruption of the music.

There have been attempts to combine the best of the vinyl world and the digital world. For example, digital DJ systems may use graphical representations of turntables displayed on a touchscreen in order to allow a user to manipulate the virtual turntable by using the same gestures and movements as used with conventional analog turntables, while controlling digital audio data. Another approach is known as the digital vinyl system (DVS), in which digital audio data are processed and played back using a digital audio unit, wherein the digital audio unit is controlled by control signals from a real turntable. A special DVS vinyl record is used with the turntable, which stores a transport reference signal, in particular a sinusoidal signal of constant frequency superimposed with a time code signal. Both signals are read out by a conventional pickup device of the turntable and interpreted or decoded to determine a rotation direction and a rotation speed of the record from the transport reference signal, and a current playback position of the record from the time code signal. An example of a conventional DVS system is described in U.S. Pat. No. 7,012,184 B2.

Even if audio systems with virtual turntables or DVS systems allow various turntable operations to be performed in connection with digital music, in particular control operations along the time axis such as jumping between different positions within a piece of music, changing playback direction, changing playback speed, the user's workflow is still interrupted frequently as switching to another device is still required for controlling different versions of a piece of music, such as versions with different audio effects, different remixes or different tracks of decomposed digital music. Therefore, a user frequently needs to switch attention from controlling playback with respect to the time axis to operation of effect control elements or vice versa, i.e. from movement of a pickup device of a turntable or movement along a virtual time axis, to manipulation of software or hardware buttons, sliders, etc., or vice versa. For example, a user frequently needs to change between operating a turntable needle and operating a computer mouse.

Moreover, DJs aim to surprise their audience with different versions of a popular song, such as a rem ix or an acapella. Once the DJ selects a song they want to play next, it is important to be able to efficiently preview the different available versions of that specific song through headphones (allowing the DJ, but not the audience, to hear selected versions), which currently typically requires going back and forth between a computer and DJ equipment.

In view of this background, there remains a need for a system for processing digital audio signals, which allows a more intuitive, straight-forward and seamless user operation for playing different versions of one and the same piece of music along a time axis.

SUMMARY

Some embodiments described herein related to a system for processing digital audio signals. The system comprises a digital audio unit configured to provide digital audio data of at least a first audio track and a second audio track. The first audio track and the second audio track represent different versions of the same piece of music. The system further comprises a user control device operable by a user to allow the user to select either a first region associated with a first time interval along a playback time axis, or a second region being associated with a second time interval subsequent to the first time interval along the playback time axis. The digital audio unit may be configured to play back audio signals obtained from the first audio track when the first region is selected and to play back audio signals obtained from the second audio track when the second region is selected.

Some embodiments relate to a vinyl-type record having an inscribed, modulated groove which stores signals. The groove is configured to be scanned by a pickup device of a turntable in order to read out the signals. The record is partitioned into a plurality of concentric regions on at least one of its two sides. Each region is formed by a plurality of continuous groove revolutions. A region identification signal, which contains an identification of the region, is stored in at least one of the regions. A system for processing digital audio signals, as described in certain embodiments herein, may read out the region identification signal in order to determine which of the regions is currently selected by a user for playback. According to the selected region, a digital audio unit may be controlled to play a specific version of a piece of music. Therefore, different versions of a piece of music may easily be selected by simply positioning a pickup device of a turntable to one of a plurality of regions, and no additional control operation is required, which would distract the DJ's attention from the turntable.

BRIEF DESCRIPTION OF THE DRAWINGS

Features, embodiments, and advantages of the present disclosure are better understood when the following Detailed Description is read with reference to the accompanying drawings, in which.

DETAILED DESCRIPTION

Figure 1:
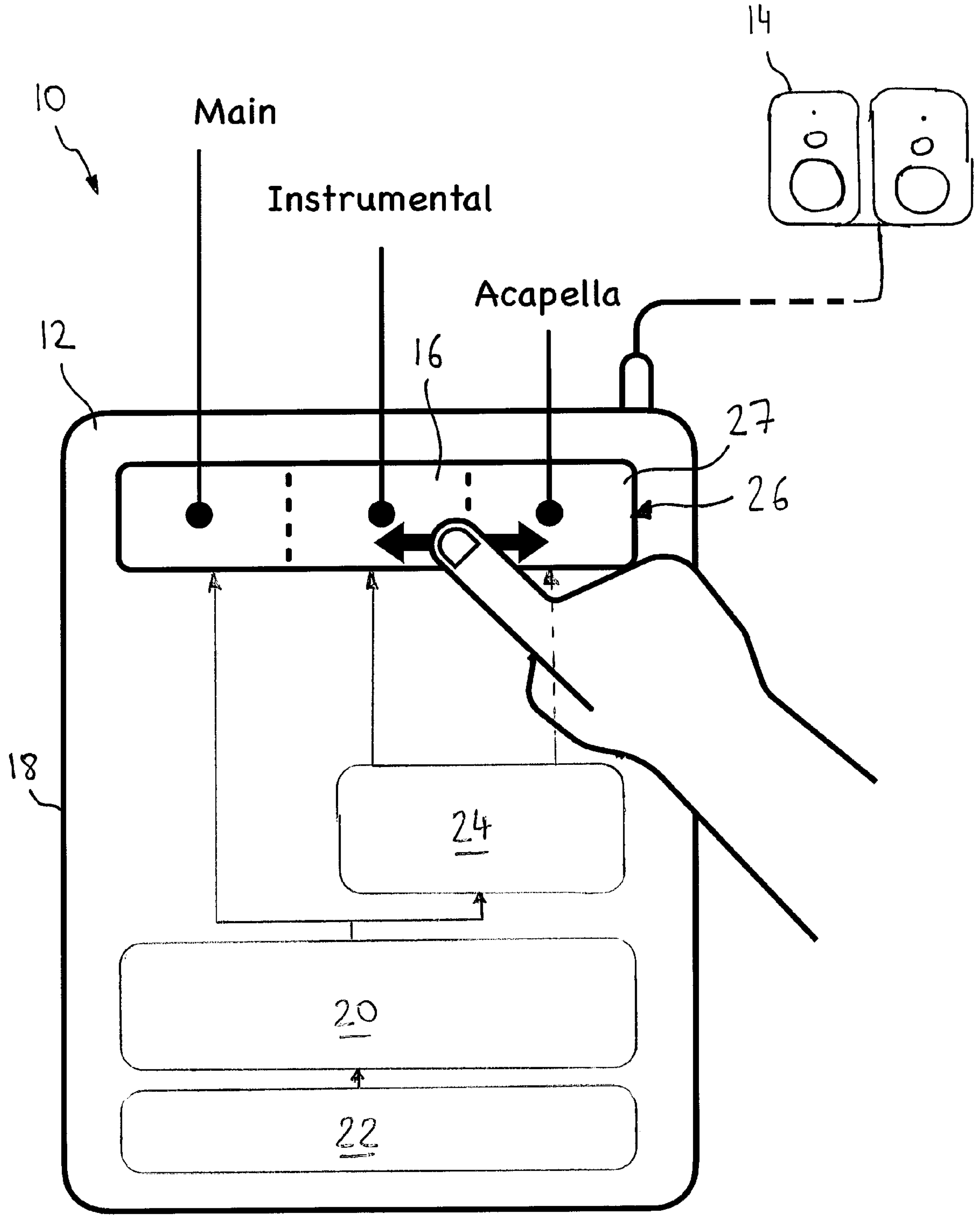
FIG. 1 shows a system for processing digital audio signals according to a first embodiment of the present invention.

Certain aspects and embodiments of the present invention relate to a system for processing digital audio signals, comprising a digital audio unit configured to provide digital audio data of at least a first audio track and a second audio track, which represent different versions of one and the same piece of music, and a user control device operable by a user to control playback of the audio tracks. Other aspects and embodiments of the invention relate to a vinyl-type record having an inscribed, modulated groove, which stores signals.

According to a first aspect of the present invention, a system is provided for processing digital audio signals, comprising a digital audio unit configured to provide digital audio data of at least a first audio track and a second audio track, which represent different versions of one and the same piece of music, and a user control device operable by a user to allow the user to select either a first region or a second region, said first region being associated with a first time interval and the second region being associated with a second time interval subsequent to the first time interval with respect to a playback time axis, wherein the digital audio unit is configured to play back audio signals obtained from the first audio track, when the first region is selected, and to play back audio signals obtained from the second audio track, when the second region is selected.

The system according to the first aspect comprises a digital audio unit providing digital audio data representing different versions of one and the same piece of music. In the context of the present disclosure, a piece of music is in particular an individual title or a song, which are available through conventional music distribution platforms, such as Apple Music, Spotify, etc., or a title or a song individually registered by conventional collecting societies/performing rights organizations, such as Broadcast Music, Inc. (BMI), The American Society of Composers, Authors and Publishers (ASCAP), Gesellschaft für musikalische Aufführungs- and mechanische Vervielfaltigungsrechte (GEMA), for example. One entire title or one entire song distributed by or registered within such platforms or organizations is referred to as one piece of music in the sense of the present disclosure.

Furthermore, different versions of a piece of music include the original version of the piece of music as well as any modifications, variations or altered copies of the same piece of music, which are recognized by a listener as belonging to the same original piece of music, but which the listener recognizes as audibly different from the original piece of music. The difference between the versions may be brought about by adding or removing audio effects, such as echo, reverberation, equalizer effects, low or high-pass effects, pitch change effects, tempo change effects, modulation, distortion etc., by loop effects or repeat effects or other time effects, such as different arrangements of portions of the piece of music, for example shorter radio edit versions with trimmed intro or long versions where a starting portion of a song is repeated a few times, i.e. resulting in an extended intro, or any combinations thereof. The effects may be applied or removed throughout the piece of music or only within a part of the piece of music. Other different versions of the same piece of music may be obtained by removing certain timbres, such as vocals, instruments, etc. from the sound of the piece of music as will be described in more detail later. In any case, different versions of the same piece of music are all based on the same musical composition and in particular may include at least one of the same characteristic melody, the same lyrics, the same chord changes, the same length, the same unique artistic features or combinations thereof.

Furthermore, the system according to the first aspect of the invention includes a user control device allowing a user to select either a first region or a second region, which regions are respectively associated to first and second time intervals with respect to a playback time axis. Based on the selection of either the first region or the second region, different versions of the piece of music are then selected for playback. As a result, a user may focus on an operation that refers to a playback time axis, for example an operation of a turntable, a virtual turntable or an operation along a virtual time axis, a time slider, etc., and at the same time the user may use such operation for switching between different versions of the same piece of music. The user therefore does not have to interrupt control operation with respect to the time axis and does not have to move to another operational environment, such as a computer screen or a different control board, when he or she desires to switch to a different version of the piece of music, for example to add an audio effect or to switch to other component tracks of the piece of music. Therefore, handling of the system of the invention is more intuitive, efficient and seamless, which allows the user to keep attention on the artistic performance rather than on complex control elements.

In an embodiment of the present invention, the user control device is further operable by the user to allow the user to select a playback position within the first region or within the second region along the playback time axis, and the digital audio unit is configured to select the first region and to set the current playback position for playback of audio signals obtained from the first audio track at the selected playback position, when the selected playback position is within the first region, and to select the second region and to set the current playback position for playback of audio signals obtained from the second audio track at the selected playback position, when the selected playback position is within the second region. In such an embodiment, selection of the playback position and selection of versions of the piece of music can be carried out by the same or similar control operations, in particular through the same user control element. Selection of the playback position and selection of the versions of the piece of music can therefore be carried out at once in a single operation.

In another embodiment of the present invention, the user control device may comprise an electronic display device configured to display a graphical representation of a playback time axis, and user input means configured to allow a user to select the first region or the second region along the playback time axis. The graphical representation may be a time line element, such as a stripe or an axis, which may show one or more markings referring to a beginning of the time axis and/or an end of the time axis and/or any specific points or regions along the time axis. In particular, markings may be provided, which allow a user to visually identify the first region and/or the second region or any further regions. However, a first region may alternatively be a region near a left end of the time axis, while a second region may be a region near a right end of the time axis, for example, in which case no specific markings would be required on the display to allow a user to distinguish between the regions. Furthermore, the time line element may show a current minute/second information (elapsed/remaining time) or may display a play head, which denotes the current playback position along the time axis and which moves along the time axis when playback is started. The user input means allowing a user to select either the first region or the second region along the playback time axis may be implemented by standard user input means of a computer device, such as a mouse, a track pad or a touchscreen.

In a further embodiment of the present invention, the user control device may comprise an electronic display device configured to display a graphical representation of a vinyl-type record and a user input means configured to allow a user to select the first region or the second region by selecting different radial positions on the graphical representation of the vinyl-type record, for example by standard user input means of a computer device, such as a mouse, a track pad or a touchscreen. Therefore, the user may control playback of the music by using control movements or manipulation as conventionally known as such from a turntable, however, without affording the costs and technical disadvantages of an analog record player. The graphical representation of a vinyl-type record may simply be achieved by one or more concentric circles, portions of which may be selected by the user.

In another embodiment of the present invention, the system may comprise a vinyl-type record and a turntable adapted to hold the record, wherein the digital audio unit is configured to receive control signals from the turntable and/or from reading out the vinyl-type record. In this embodiment, by using an actual vinyl-type record as well as a turntable, it is possible to provide to the user the authentic look and feel of the original setup as well as the original hardware control features of a turntable, while at the same time utilizing the advantages of digital audio processing in the digital audio unit. The turntable may be adapted to rotatably support the record and the user may control the digital audio unit by manually rotating the turntable and/or a vinyl-type record placed on the turntable. Alternatively, the record may be fixed to the turntable and a pickup element or another control element of the turntable may be rotated relative to the record. In any case, control signals for controlling the digital audio unit are generated by the system upon detection of a relative movement between the turntable and the vinyl-type record and/or between the pickup or control element and the vinyl-type record.

The user control device may comprise user input means configured to allow a user to select the first region or the second region by selecting different radial positions on the vinyl-type record. As known as such from conventional vinyl-type records, different radial positions on the vinyl-type record correspond to the different time intervals with respect to a playback time axis of the vinyl-type record. The playback time axis corresponds to the typical movement of a pickup element of the turntable from a position nearer to the outer edge of the record towards nearer the center of the record when the record rotates and playback is in progress. Thus, the first region may be more radially outward than the second region, which means that a second time interval associated with the second region is subsequent to a first time interval associated with the first region. Furthermore, a vinyl-type record having two sides, an A-side and a B-side, may be regarded as defining a single time axis which reaches across both sides, i.e. starting from a position nearer to the outer edge of the A-side of the record to a position nearer to the center of the A-side of the record, then continuing at a position nearer to the outer edge of the B-side of the record to finally reach an end position nearer to the center of the B-side of the record.

This does not necessarily mean that the vinyl-type record of the system of the invention always has a spiral groove, which extends throughout the first region and the second region, such that a play head reading out the groove is in fact continuously moved through the first region and subsequently through the second region. In some embodiments, first and second regions may have separate grooves, which are not connected to one another or they may even have no grooves at all. In any case, however, a playback time axis of a vinyl-type record is defined as running from an outer edge of the record towards the center of the record.

The user input means are configured to allow a user to select first and second regions along the playback time axis of the vinyl-type record in order to control the digital audio unit to play back audio signals obtained from the first audio track and the second audio track, respectively. In particular, the user input means may comprise a control body movable by the user relative to the vinyl-type record, such as to approach different radial positions on the vinyl-type record and thereby select the first region or the second region or any other region that may be provided along the time axis. The movement of the control body as approaching radial positions may be detected in any suitable manner, for example by an acceleration sensor placed at the control body, by a camera, by a magnetic sensor, etc. In a preferred embodiment, the control body is a pickup device of the turntable, which is adapted to scan an inscribed, modulated groove of the record, such as to read out signals stored in the groove. Selection of the first or second region (or any other region) can then be determined from the signals read out from the groove by the pickup device. The pickup device may be a conventional turntable pickup needle or an optical scanning system adapted to scan the groove of the record.

In another embodiment of the invention, the vinyl-type record may comprise at least one circular demarcation line which is visible to a human eye as separating the first region from the second region. The circular demarcation line may assist the user in recognizing the regions and selecting the correct region. Demarcation lines may be provided by either forming one or more circles with specific profiles, which are visually distinguishable from the other grooves, or by a suitable coloring, for example.

In another embodiment of the present invention, the system may further comprise a vinyl-type record, which has an inscribed, modulated groove which stores signals, wherein the record, on at least one of its two sides, is partitioned into a plurality of concentric regions, each region being formed by a plurality of continuous groove revolutions, wherein, in at least one of the regions, there is stored a region identification signal, which contains an identification of the region, a turntable adapted to support the vinyl-type record, a pickup device which is adapted to scan the groove of the vinyl-type record such as to read out the region identification signal stored in the groove, and a region determination unit configured to determine a currently selected region based on the region identification signal.

By using a region identification signal stored within the groove of at least one region, a region that is currently selected by the user can reliably and quickly be determined by the system, and the digital audio unit can be controlled according to the selected region without time delay and without requiring more complex sensing means.

In another embodiment of the present invention, the system comprises a vinyl-type record, a turntable adapted to support the vinyl-type record, and a transport determination unit configured to determine a transport parameter of the turntable, which corresponds to at least one of a rotation direction and a rotation speed of the vinyl-type record, wherein the digital audio unit is configured to modify playback of the audio signals based on the transport parameter. In this embodiment, playback of the digital audio unit may be controlled with respect to playback speed and/or playback direction based on control signals generated upon detection of a manipulation of a vinyl-type record and/or a turntable by a user. Hence, a user may easily accelerate, slow down, stop or reverse playback or generate scratch effects (alternate forward and backward playback with variations in tempo) by manipulating the vinyl-type record or the turntable in a conventional manner, while using all advantages of digital audio processing with respect to audio quality, availability of music, application of digital effects, analysis of digital audio data, etc.

In a preferred embodiment of a system having a transport determination unit as described above, the vinyl-type record may have an inscribed, modulated groove storing a transport reference signal. The system may further comprise a pickup device, which is adapted to scan the groove of the record, such as to read out the transport reference signal, and the transport determination unit may be configured to determine the transport parameter based on the transport reference signal. With such configuration, the turntable does not need to be equipped with several sensors for detecting rotation direction and/or rotation speed of the vinyl-type record or the turntable, such that even conventional, analog turntables may be used for such purposes as long as the record has the transport reference signal stored therein. The transport reference signal may be formed by a periodic signal, for example a constant sinus sound, such that rotation speed and change of direction may be detected by simple digital analysis of the periodicity of the transport reference signal read out from the groove, such as by simply detecting a change in pitch of the signal and digitally interpreting such pitch change. Alternatively, the transport reference signal might be represented by two sinusoidal signals stored within the left and right stereo channels of a stereo record (such as the left and right sides of the groove of the record), wherein the two sinusoidal signals are phase shifted relative to one another by 90°, wherein rotation speed and rotation direction may be detected by detecting a phase offset between the two signals as received by the pickup device upon scanning the rotating record.

In a further embodiment of the present invention, the system may comprise a vinyl-type record, a turntable adapted to support the vinyl-type record, and a position determination unit configured to determine a current turntable playback position associated to the turntable, and wherein the digital audio unit is configured to play back the audio signals obtained from the first or second audio track at a playback position along the playback time axis which corresponds to the turntable playback position. A position determination unit allows a user to control a playback position within the first or second audio track in a conventional manner by controlling the playback position of the turntable (for example choosing a desired position of a pickup element of the turntable in radial direction of the record), wherein the digital audio unit sets a current playback position such as to correspond to the turntable playback position. In such a system, the vinyl-type record may have an inscribed, modulated groove which stores a time-code signal representing a position along the length of the groove (or a position along the time axis of record), wherein the system further comprises a pickup device which is adapted to scan the groove of the record such as to read out the time-code signal, and wherein the position determination unit is configured to determine the turntable playback position based on the time-code signal. Therefore, the radial position or playback position of the turntable does not need to be detected by any additional sensors, but may be quickly and reliably determined from reading the time code signal stored in the groove of the record.

In a further embodiment of the present invention, the system may further comprise a region changing unit configured to detect a region change operation initiated by the user operating the user control device to change the selected region from a current region associated to a current track of the first and second tracks to a next region associated to a next track of the first and second tracks, wherein the region changing unit, upon detection of the region change operation, is configured to stop playback of the current track and to start playback of the next track, wherein a playback position within the next track at which playback of the next track is started is chosen based on the playback position within the current track at which playback is stopped. In this embodiment, changing of the region and thus changing of the version of the piece of music may be performed without changing the current playback position within the piece of music, such that switching to another version can be performed smoothly and without interruption or disturbance of the flow of the music. For example, if the first audio track is played back at the beginning of the first chorus, and the user then selects any position within the second region, the digital audio unit switches playback to the second audio track and starts playback of the second audio track again at the beginning of the first chorus, even if the exact position within the second audio track which the user has selected would correspond to a different playback position within the second audio track, for example anywhere at the end of the second audio track. In other words, the playback position may be temporarily locked in case the user jumps to a different region.

In most cases, different versions of the same piece of music have exactly the same total playback duration. In all these cases, when changing the region, the region changing unit may simply choose the playback position within the next track to be equal to the playback position within the current track. However, in cases where the next track is a version of the piece of music which has a total playback duration T2, which is different from a total playback duration T1 of the current track, such as when the next track is a version with increased or decreased BPM, the relative position within the track may be maintained. More specifically, if t1 is the playback position within the current track at which playback of the current track is stopped, T1 is the total playback duration of the current track, t2 is the playback position within the next track at which playback of the next track is started, and T2 is the total playback duration of the next track, then $t1/T1=t2/T2$ holds. Therefore, continuous playback and uninterrupted performance is ensured when changing to different versions of the piece of music with differing lengths.

In another embodiment of the present invention, the digital audio unit is configured to provide audio data of a mixed track and at least a first component track, wherein said mixed track is composed from a mixture of source tracks representing different musical timbres, and the first component track is phonetically equal to a first source track of the source tracks of the mixed track, and at least one of the first audio track and the second audio track is obtained based on the first component track.

Component tracks representing one or more but not all of the musical timbres of the original piece of music may form a powerful tool for creating engaging performances, in particular during a live performance of a DJ. Usually, such component tracks need to be provided or selected in a separate step or by a separate device and cannot easily be included in ongoing live performance. Although recent developments in this field allow generating component tracks from mixed audio tracks even in real time, separate control devices and dedicated control elements need to be operated by the user in order to create or select desired component tracks. In the embodiment of the present invention as described above, a standard control movement along a time axis, which is one of the major routine operations of a DJ and which is intuitively handled by a DJ, can be utilized to not only move forward or backward along the time axis but also to quickly switch to different component tracks or mixtures of component tracks.

Nowadays, nearly all pieces of music which are generally available are mixed tracks in the sense of the present inventions since they have been produced by mixing several source tracks. In particular, in the context of the present disclosure, mixed tracks are representative of audio signals obtained from mixing a plurality of source tracks, in particular during music production or during recording of a live musical performance of instrumentalists (including drummers) and/or vocalists. Thus, mixed tracks may usually originate from a previous mixing process that has been completed before the start of the processing of audio data according to the present invention. In particular, the mixed audio data may be included in audio files together with meta data, for example in audio files containing a piece of music that has been produced in a recording studio by mixing a plurality of source tracks of different timbres. For example, a first source track may be a vocal track (vocal timbre) obtained from recording a vocalist via a microphone, while a second source track may be an instrumental track (instrumental timbre) obtained from recording an instrumentalist via a microphone or via a direct line signal from the instrument or via MIDI through a virtual instrument. Usually, a plurality of such tracks are recorded at the same time or one after another. The plurality of source tracks are then transferred to a mixing station, wherein the source tracks are individually edited, various sound effects and individual volume levels are applied to the source tracks, all source tracks are mixed in parallel, and preferably one or more mastering effects are eventually applied to the sum of all tracks. At the end of the production process, the final audio mix, usually a stereo mix, is stored in a suitable recording medium, for example in an audio file on the hard drive of a computer. Such audio files preferably have a conventional compressed or uncompressed audio file format, such as MP3, WAV, AIFF or other, in order to be readable by standard playback devices, such as computers, tablets, smartphones or DJ devices. For processing according to the present invention, the mixed tracks may then be provided as audio files by reading the files from local storage means (for example SSD's, Hard Drives, USB Sticks, SD Cards, CDs, etc.), receiving the audio files from a remote server, for example via streaming through the Internet, or in any other manner.

Mixed tracks include a mixture of audio signals of different musical timbres, wherein the timbres originate from different sound sources, such as different musical instruments, different software instruments or samples, different voices etc. In particular, a certain timbre may refer to at least one of:

- a recorded sound of a certain musical instrument (such as a bass, piano, drums (including acoustic drum set sounds, electronic drum set sounds, percussion sounds), guitar, flute, organ etc.) or any group of such instruments;
- a synthesizer sound that has been synthesized by an analog or digital synthesizer, for example to resemble the sound of a certain musical instrument (such as a bass, piano, drums (including classical drum set sounds, electronic drum set sounds, percussion sounds), guitar, flute, organ etc.) or any group of such instruments or to form a different sound that cannot be produced by traditional musical instruments;
- a sound of a vocalist (such as a singing or rapping vocalist) or a group of vocalists;
- any combination thereof.

In another embodiment of the present invention, the first audio track and the second audio track may each be obtained from one of the following tracks or from a mixture of two or more of the following tracks:

- the mixed track,
- the first component track,
- a second component track, which is phonetically equal to a second source track of the source tracks of the mixed track,
- wherein at least one of the mixed track, the first component track and the second component track is included in the first audio track but not in the second audio track, or is included in the second audio track but not in the first audio track.

Therefore, the first audio track and the second audio track may be predefined component tracks or mixtures thereof, which can easily be selected by the user. For example, on a time axis of the system, such as along the time axis of a vinyl record in radial direction of the vinyl record or along a linear time axis on a display of an electronic device, there may be arranged a first region associated to the mixed track, a second region associated to a first component track, for example an instrumental component track, which includes only the instrumental component of the mixed track (including drums or similar instruments), and a third region associated to a second component track, for example a vocal component track, which includes only the vocal components of the mixed track or an a cappella version of a mixed track. The user may then operate the user control device (for example a turntable) to select one of the first to third regions in order to playback either the mixed track, the first/instrumental component track or the second/vocal component track as desired, and the user may use the same user control device operating along the same time axis in order to control other operations on the time axis as well, such as changing the current playback position, changing playback speed or changing playback direction.

The component tracks may be provided from separate input audio data, such as separate audio files (separate stem files or multitrack files), in addition to the mixed track. Preferably, however, the system may comprise a decomposition unit, wherein at least the first component track (preferably also further component tracks) is a decomposed track generated by the decomposition unit through decomposing the mixed track. Therefore, the advantages described above may be achieved for any piece of music that is available from a digital audio file, via streaming or in any other manner and not only for material that is available as decomposed files. In particular, the decomposition unit may include an artificial intelligence system (AI system), which comprises a trained neural network, which allows high quality decomposition of a mixed track in short time or even in real time (if decomposition processing speed is faster than playback speed). More specifically, the AI system may implement a convolutional neural network (CNN), which has been trained by a plurality of data sets for example including a vocal track, a harmonic/instrumental track (which may include drum instruments or similar instruments) and a mix of the vocal track and the harmonic/instrumental track.

A second aspect of the present invention, involves a vinyl-type record having an inscribed, modulated groove which stores signals, said groove being configured to be scanned by a pickup device of a turntable in order to read out the signals, wherein the record, on at least one of its two sides, is partitioned into a plurality of concentric regions, each region being formed by a plurality of continuous groove revolutions, wherein, in at least one of the regions, there is stored a region identification signal, which contains an identification of the region. According to an important feature of the invention of the second aspect, the vinyl-type record has a plurality of regions and a region identification signal is stored in at least one of the regions. A system such as the system of the first aspect of the invention, may read out the region identification signal in order to determine which of the regions is currently selected by a user for playback. According to the selected region, a digital audio unit may be controlled to play a specific version of a piece of music. Therefore, different versions of a piece of music may easily be selected by simply positioning a pickup device of a turntable to one of a plurality of regions, and no additional control operation is required, which would distract the DJ's attention from the turntable. The regions may be virtual regions, which are not clearly separated from one another from the viewpoint of the user. For example, a first region may be anywhere near an edge of the record, while a second region may be anywhere near a center of the record. However, in a preferred embodiment, adjacent regions may be separated from one another by means of a demarcation line, which is visible to a human eye. Such demarcation lines may be obtained by grooves of distinct profile or by suitable coloring.

In at least one of the regions, there may be stored a transport reference signal, which, when read out by the pickup device, allows determination of at least one of a scanning speed and a scanning direction between the pickup device and the groove. This means that a transport reference signal may be superimposed to the region identification signal. For example, the two signals may respectively be written on different sides of the same stereo groove of a stereo record, or they may be superimposed by means of amplitude modulating. Accordingly, when a user changes the rotation speed or rotation direction of the record by manual manipulation, such manipulation can be reflected by a corresponding change of playback speed or playback direction of a digital audio unit receiving control signals from the turntable on which the record is placed.

The region identification signal is preferably stored substantially along the entire length of the groove in at least one of the regions. Therefore, regardless of where exactly a user positions the pickup device within the region, the region identification signal can always be read out and a digital audio unit can identify the currently selected region.

The region identification signal and/or the transport reference signal may be formed by a periodic signal and preferably by a sinus sound or any other signal of constant or locally constant pitch. This simplifies decoding of the signals, because a simple pitch detection through an analog digital converter may be used.

In another embodiment of the invention according to a second aspect, in at least one of the regions, there may be stored a time code signal representing a position along the length of the groove. In this way, the signals read out from the record may also be used to determine a current playback position of the pickup device along the groove or along the time axis of the record. Accordingly, a playback position of the digital audio tracks as set in the digital audio unit may be set corresponding to the playback position of the record. It is noted that the time code signal and/or the transport reference signal as well as the method of decoding these signals may be configured in a manner known as such for conventional DVS systems.

In a further embodiment of the present invention, in at least one of the regions, the groove has a spiral portion, in which a distance between a center of the record and the groove changes as the record revolves, and a circular portion, in which a distance between the center of the record and the groove is constant as the record revolves, wherein the spiral portion opens into the circular portion. In such an embodiment, the pickup device will be prevented from automatically moving to the next region when arriving at the end of the current region. Therefore, an unexpected change of the version of the piece of music can be avoided.

It should be noted that the features of the first and the second aspects can be combined to achieve advantageous embodiments of the invention. In particular, a system according to the first aspect of the invention may comprise a vinyl-type record according to the second aspect of the invention, a turntable adapted to hold the record, and a pickup device which is adapted to scan the groove of the record, such as to read out a signal stored in the groove, wherein the digital audio unit of the system is configured to receive control signals from the turntable and/or from reading out the vinyl-type record.

FIG. 1 shows a system 10 for processing digital audio signals according to a first embodiment of the present invention, which is implemented as a music player 12 capable of playing music, for example via external speakers 14 or alternatively via internal speakers (not shown) or via headphones (not shown). The music player 12 may be implemented by a computer, a tablet or a smartphone running a suitable software application. It may comprise input means formed by a standard input means such as a touchscreen 16 in the present embodiment, or alternatively a keyboard, a mouse or other external input devices.

Music player 12 may further include electronic hardware such as a microprocessor RAM, ROM, internal or external storage means, a communication interface for wireless or wired data communication with external devices or networks, such as the Internet, as well as a casing 18.

In the present embodiment, music player 12 comprises a digital audio unit having an input section 20, which receives input audio data representing a mixed track of a piece of music, i.e. a song, in digital format. The input audio data may be read from an internal storage device (not shown) of the music player 12 or may be streamed through a communication interface 22, in particular a wireless communication interface, from an external network, such as the Internet. In particular, input section 20 may receive digital input audio data through the communication interface 22 from music distribution portals such as Apple Music, Spotify, etc. The input audio data may be preprocessed (for example decompressed and/or decoded) within input section 20.

In general, the input audio data may already contain data of different versions of one and the same piece of music, such as different remixes, versions with different audio effects or different stems or component tracks. However, in the present example of the first embodiment of the invention, the input audio data are forwarded to a decomposition section 24, which includes an artificial intelligence system including a trained neural network and is configured to separate different timbres contained in the piece of music, for example an instrumental timbre and vocal timbre. In this way, the mixed track (a first version of the piece of music) is decomposed by decomposition section 24 to obtain a first component track, for example an instrumental component track (including a sum of all individual instrument timbres, i.e. without vocals), and a second component track, for example a vocal component track. Of course, in other embodiments of the invention, component tracks of other timbres may be obtained by the decomposition section, such as a bass component track, a drum component track, etc.

The component tracks, here the instrumental track and the vocal track, are passed from the decomposition section 24 to a user control section 26. In the present embodiment, user control section 26 also receives the original mixed track directly from input section 20, i.e. the audio data that represent the original version of the piece of music. As a result, the user control section 26 receives three different versions of the same piece of music, namely the original mixed track (Main), the instrumental component track (Instrumental), and the vocal component track (Acapella).

User control section 26 includes a display portion of the touchscreen 16, which shows a graphical representation of a playback time axis T, for example a longitudinal timeline element 27. In the present example, the timeline element 27 forms a touch-sensitive strip extending along the virtual playback time axis T (in FIG. 1 from left to right). Positions along the timeline element 27, i.e. along the playback time axis T, correspond to different playback positions within the audio tracks of the different versions of the piece of music.

Figure 2:
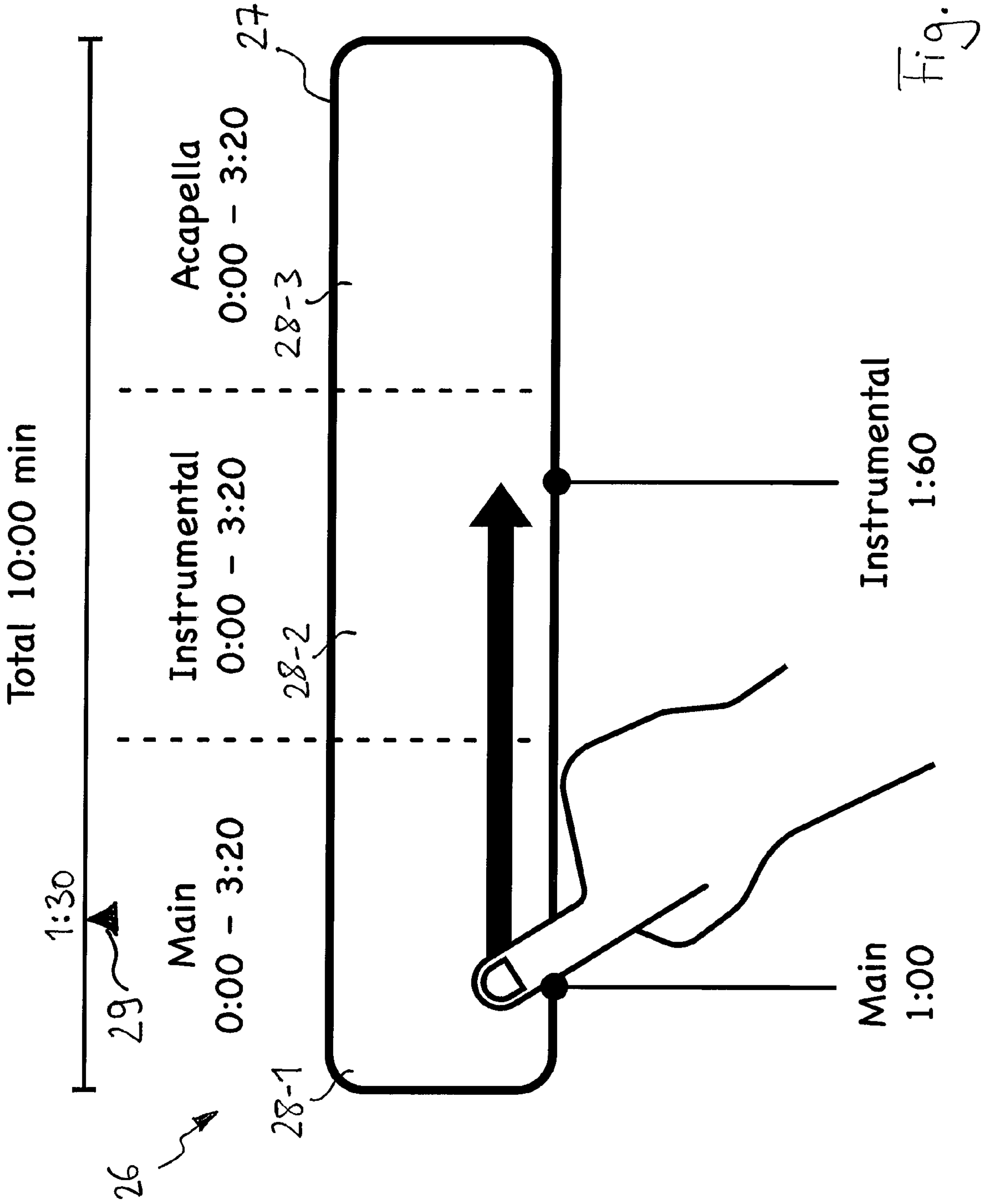
FIG. 2 shows an enlarged portion of a display region of the system of the first embodiment.

This will be further explained with respect to the enlarged view of the user control section 26 in FIG. 2. User control section 26 shows the timeline element 27 as being divided into a first region 28-1 on the left, followed by a second region 28-2 in the middle and a third region 28-3 on the right. The first region 28-1 is associated with the original mixed track (main), and positions along the timeline element 27 within the first region 28-1 are associated with corresponding playback positions along the time axis within the original mixed track. Likewise, the second region 28-2 is associated with the instrumental component track, and positions along the timeline element 27 within the second region 28-2 are associated with corresponding playback positions along the time axis within the instrumental component track. Likewise, the third region 28-3 is associated with the vocal component track, and positions along the timeline element 27 within the third region 28-3 are associated with corresponding playback positions along the time axis within the vocal component track.

In the example of the first embodiment shown in FIG. 2, the original mixed track, i.e. the subject piece of music, has an overall playback duration of three minutes and twenty seconds. Its instrumental version formed by the instrumental component track as well as its vocal version formed by the vocal component track both have the same length of three minutes and twenty seconds. At the timeline element 27 displayed by user control section 26, the graphical representations of all three versions of the piece of music are arranged one after another such as to apparently occupy three consecutive time intervals of three minutes and twenty seconds each. Therefore, the timeline element 27 represents an overall playback duration of ten minutes.

The music player 12 may have a position-sensitive mode, in which user selection of the timeline element 27 at a certain position within one of the regions 28-1, 28-2, 28-3, such as touching a certain position, is interpreted as a command to set the current playback position of the digital audio unit to the respective position along the time axis of the current track. This means that for example a swiping movement as shown in FIG. 2 from a position of one minute and zero seconds within the original mixed track (Main) towards a playback position of two minutes and forty seconds within the instrumental component track (instrumental) will not only change the version of the piece of music currently played back (from the mixed track to the instrumental component track) but will also change the current playback position moving it in forward direction by one minute and forty seconds.

The music player 12 may also be operated in a position-lock mode in which a change of the region initiated by the user leaves the current playback position unchanged. In such a mode when performing the swiping gesture as shown in FIG. 2, from the first region 28-1 to the second region 28-2, the playback position relative to the current track remains unchanged. For example, if the current playback position within the original mixed track as displayed by play head 29 is at one minute and thirty seconds, a swiping movement as shown in FIG. 2, which starts at a position corresponding to about one minute and zero seconds in the original mixed track towards a position corresponding to about two minutes and forty seconds within the instrumental component track, will result in switching of the version of the piece of music played back from the original mixed track to the instrumental component track, whereas playback of the mixed track will be stopped at zero minutes and thirty seconds, i.e. at the current playback position, and playback of the instrumental component track will be started at zero minutes and thirty seconds, i.e. at the same playback position at which playback of the mixed track was stopped. This ensures continuous playback without interruption or breaks of the rhythm.

Figure 3:
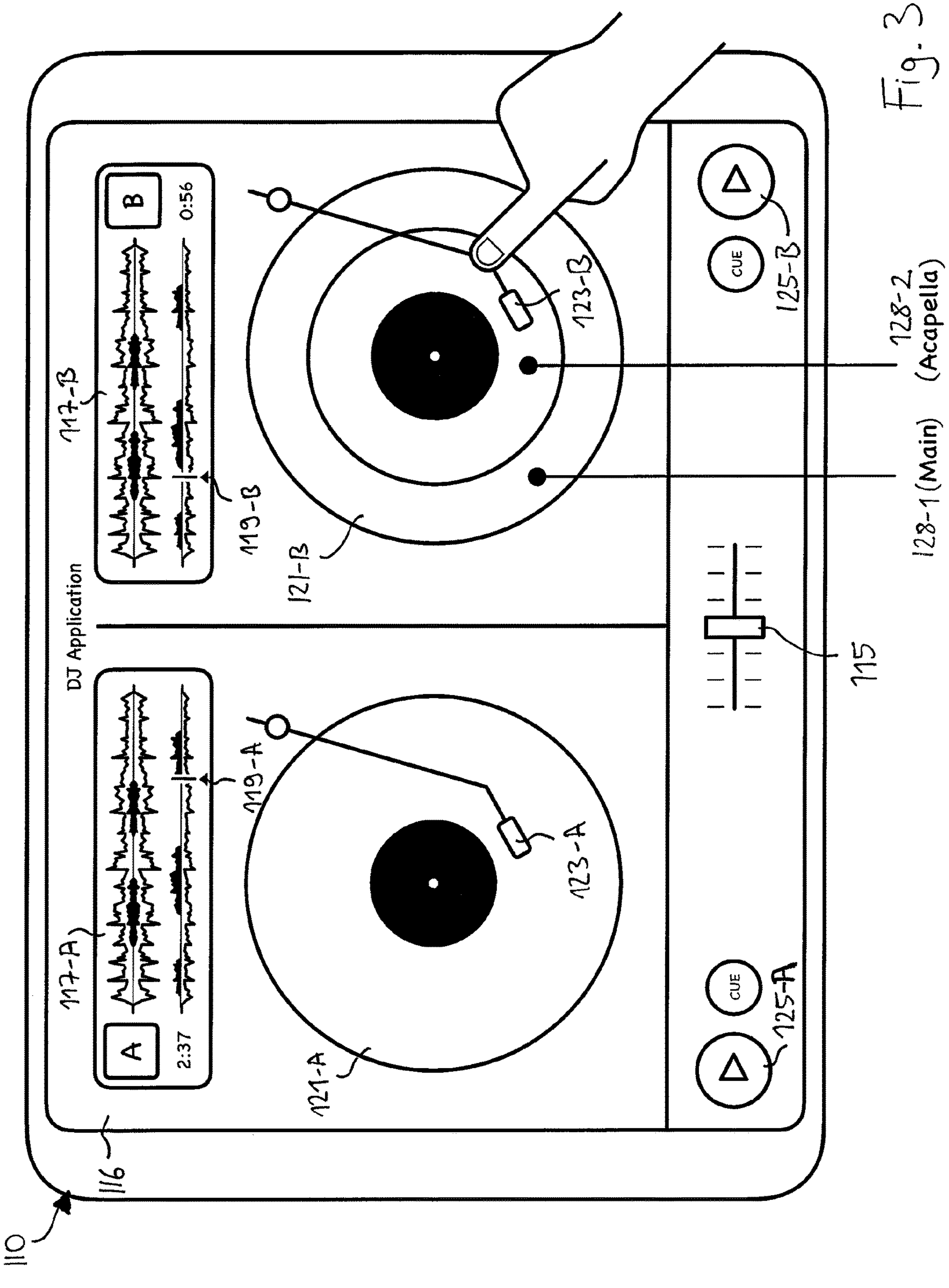
FIG. 3 shows a system for processing digital audio signals according to a second embodiment of the present invention.

FIG. 3 shows a second embodiment of the present invention, in which the invention is implemented by a DJ application running on a computer 110 such as a tablet computer or a smartphone. The computer 110 has a touch-sensitive display 116 showing several graphical representations of control elements or information about operational conditions of the computer 110. The computer 110 and the DJ application running on the computer 110 may be configured to receive digital audio data of two different songs A and B (i.e. two different pieces of music). Information and control elements related to song A are displayed on a left part of display 116, whereas information and control elements related to song B are displayed on a right part of the display 116. Songs A and B can be controlled and played back independently from one another by operating respective control elements on the left and right parts of display 116, respectively, and they can be mixed and crossfaded by means of a crossfader 115 as known as such for DJ devices.

The left part of the display 116 may include a song information display portion 117-A, which displays certain information about song A, such as a title of song A, a graphical representation of a waveform of song A and a play head 119-A noting a current playback position of song A. Furthermore, the left part of display 116 may include a transport control portion showing a graphical representation 121-A of a vinyl-type record as well as a graphical representation 123-A of a pickup device. Touch and swiping gestures carried out on the graphical representation 121-A of the vinyl-type record cause a change of the playback speed and/or the playback direction of song A, such as to simulate operation of a conventional vinyl-type record on a conventional turntable. Furthermore, a touch or a swiping gesture on the graphical representation of pickup device 123-A will cause a change in playback position along the time axis of song A. In addition, a start/stop button 125-A may be provided to allow the user to start or stop playback of song A.

The right part of display 116 may include the corresponding display portions as provided on the left part of display 116, but for song B. in particular, a song information display portion 117-B may display certain information about song B, such as a title of song B, a graphical representation of a waveform of song B and a play head 119-B noting a current playback position within song B. Furthermore, a transport control portion related to song B on the right part of display 116 may include a graphical representation 121-B of a vinyl-type record and a graphical representation 123-B of a pickup device. Touch or swiping gestures on the graphical representation 121-B of the vinyl-type record will cause a change in playback direction or playback speed of song B. Furthermore, a touch or a swiping gesture on the graphical representation of pickup device 123-B will cause a change in playback position along the time axis of song B. In addition, a start/stop button 125-B may be provided to allow a user to start or stop playback of song B.

As shown in FIG. 3, the graphical representation 123-B of the vinyl-type record for song B shows two different radial portions, an outer radial portion 128-1 (Main) and an inner radial portion 128-2 (Acapella). The two regions 128-1, 128-2 may be associated to two different versions of the same song B, for example, an original mixed track and a vocal component track. The original mixed track and the vocal component track may be obtained in a manner as described in the first embodiment with respect to FIGS. 1 and 2. Of course, other versions of song B may be associated to the first and second regions 128-1, 128-2, and more than two regions for more than two versions of a piece of music may be provided.

By moving the graphical representation 123-B of the pickup device to either the first region 128-1 or the second region 128-2 through a corresponding touch or swiping gesture, either the first region 128-1 or the second region 128-2 may be selected and the computer 110 may be controlled to playback either the first version or the second version of song B, respectively.

Furthermore, moving the graphical representation 123-B of the pickup device to different radial positions on the graphical representation 121-B of the vinyl-type record may cause the computer 110 to change the current playback position within either of the tracks, similar as described with respect to the first embodiment. Furthermore, other features and functions as described with respect to the first embodiment, for example the implementation of a position-sensitive mode and a position-lock mode, may be implemented in the second embodiment as well, if desired.

A third embodiment of the present invention will now be described with respect to FIG. 4. In the third embodiment, a system 210 for processing digital audio signals comprises a (real) turntable 230 mounting a (real) vinyl-type record 221 for rotation about a central rotational axis 231, wherein the turntable 230 may further include a pickup device 223, which is movable with respect to the vinyl-type record 221. Pickup device 223 may for example comprise a lever 227 that is pivotably mounted on a pivot axis 229, which may run parallel to the central rotational axis 231 of the vinyl-type record 221. As conventionally known, for example from analog turntables, pickup device 223 may be positioned at different radial positions with respect to the vinyl-type record 221, wherein a time axis T (from the view point of a user operating the pickup device 223) is defined along the radial direction from an outer edge 233 of the vinyl-type record 221 towards the central axis 231 of the vinyl-type record 221.

Vinyl-type record 221 has an inscribed, modulated groove storing signals that can be read out by the pickup device 223 when the record 221 rotates. As conventionally known as such, pickup device 223 may have a needle running within the groove of the record 221, wherein the signals are read out by measuring deflection of the needle due to the inscribed modulations within the groove. Alternative pickup devices may use optical scanning systems to detect the modulations within the grooves by optical means.

Figure 4:
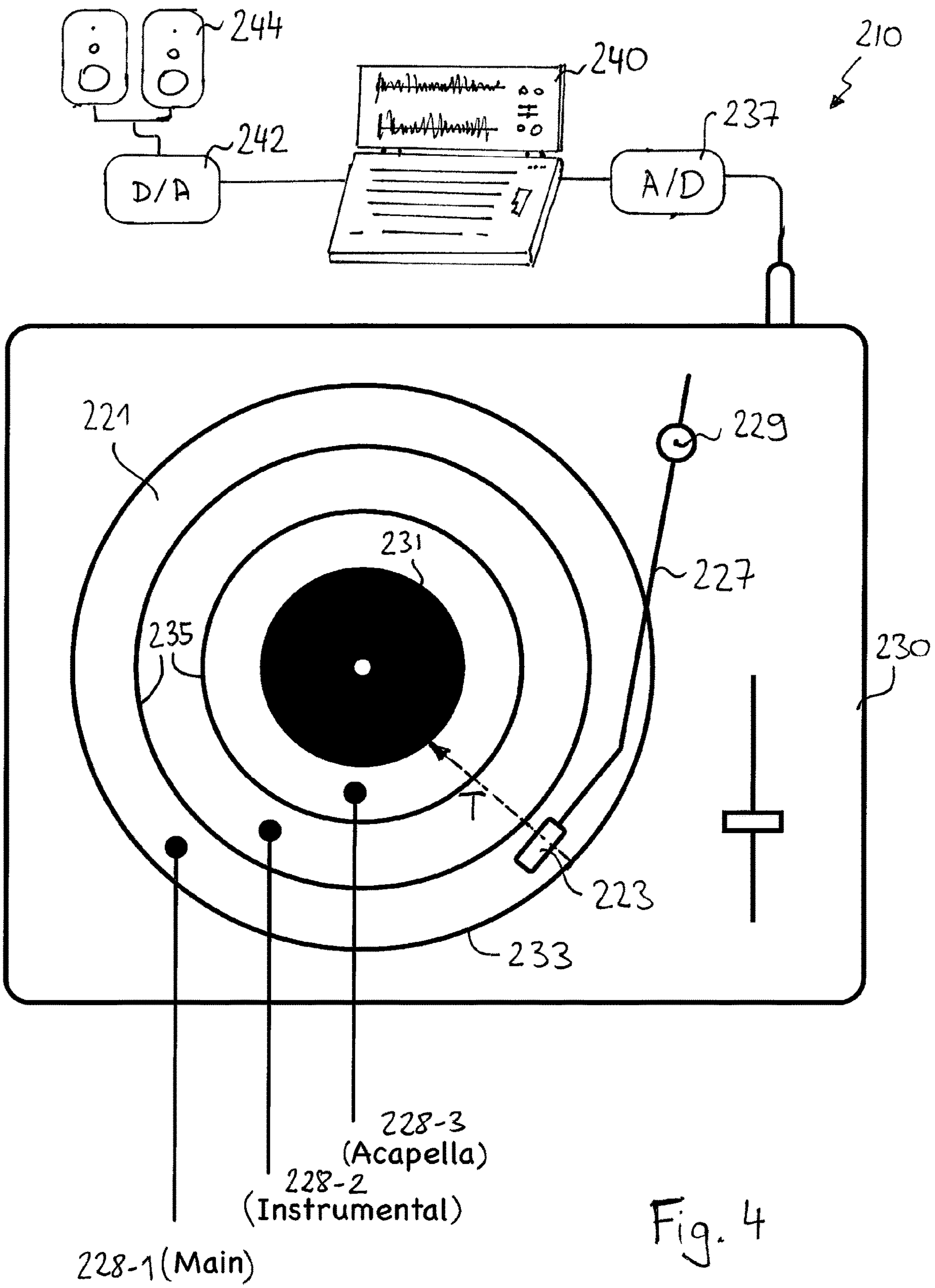
FIG. 4 shows a system for processing digital audio signals according to a third embodiment of the present invention.

As can be seen in FIG. 4, the vinyl-type record 221 comprises a plurality of radial regions, for example, a ring-shaped first region 228-1 formed by an outer ring near the edge 233 of the record 221, a ring-shaped third region 228-3 at an inner circumferential portion of the record 221 and a ring-shaped second region 228-2 arranged radially between the first region 228-1 and the third region 228-3. Record 221 is therefore divided into three concentric, ring-shaped portions, which follow one after another along the time axis T. The regions 228-1, 228-2 and 228-3 may be separated from one another by circular demarcation lines 235, which are visible to a human eye in order to assist the user in selecting one of the regions, i.e. setting the pickup device 223 within a desired region.

The system 210 further includes a computer 240 which receives pieces of music, i.e. songs, as digital input audio data from an internal storage device (not shown) of the computer 240 or via streaming through a communication interface of the computer 240 from an external network, such as the Internet. In particular, the computer may receive songs in digital format from music distribution portals such as Apple Music, Spotify, etc. The computer 240 forms a digital audio unit in the sense of the present invention configured to play back digital audio tracks.

Turntable 230 is connected to the computer 240, in particular via an analog digital converter 237, which converts the analog signals read out from the record 221 through pickup device 223 into digital control signals. The computer 240 decodes or interprets the signals read out from the record 221 and controls processing and playback of audio signals based on the control signals. This means that turntable 230 does not send audio signals representing any actual audio content or any audio waveform to the computer. Rather the audio content or audio waveforms played back by the computer originate from a different source, such as the a digital storage device connected to the computer or an external network as described above, and the turntable just sends control signals to control playback of audio content or audio waveforms.

More particularly, within the grooves of the first, second and third regions 228-1, 228-2 and 228-3, region identification signals may be stored, which represent identification information of the respective region, for example, an identification number or identification code unique to the particular region. For example, the regions may each store periodic signals having different period lengths, wherein the period lengths may be determined by the computer 240 and the computer 240 may determine the region based on the detected unique period length.

In another preferred example, the transport reference signal may be stored on the record in form of a sine wave signal with a bitstream superimposed by means of amplitude modulation. This bitstream may be a pseudorandom sequence, for example, generated by a linear feedback shift register (LFSR) fulfilling the maximum length requirement with each N bit (e. g. N=20) substring only occurring once in the sequence. The transport information may then be retrieved by decoding N bits from the bitstream and relating it back to its unique position. Region identification is achieved by inscribing different pseudorandom sequences, e.g. generated by LFSRs with different tap configurations, in the regions of the vinyl record. During interpretation the digital audio unit may then retrieve the transport information to use for playback control and identify the specific sequence to identify the selected region.

Computer 240 may then choose one of a plurality of different versions of one and the same piece of the music, according to the current region. For example, the computer 240 may be capable of playing three different versions of a song as described above with respect to the first and the second embodiments, in particular an original mixed track, an instrumental component track or a vocal component track, wherein the component tracks are obtained from decomposing the original mixed track within a decomposition unit. For example, if the pickup device 223 of the turntable 230 is positioned anywhere within the first region 228-1, the computer 240 plays back the original mixed track, if the pickup device 223 is moved to a position anywhere within the second region 228-2, the computer 240 plays back the instrumental component track, and if the pickup device 223 of turntable 230 is moved to a position anywhere within the third region 228-3, the computer 240 is controlled to play back the vocal component track.

The audio signals played back by computer 240 may be output via a digital analog converter 242 to loudspeakers 244. Alternatively, internal speakers of the computer 240 or headphones may be used for sound output.

Figure 5:
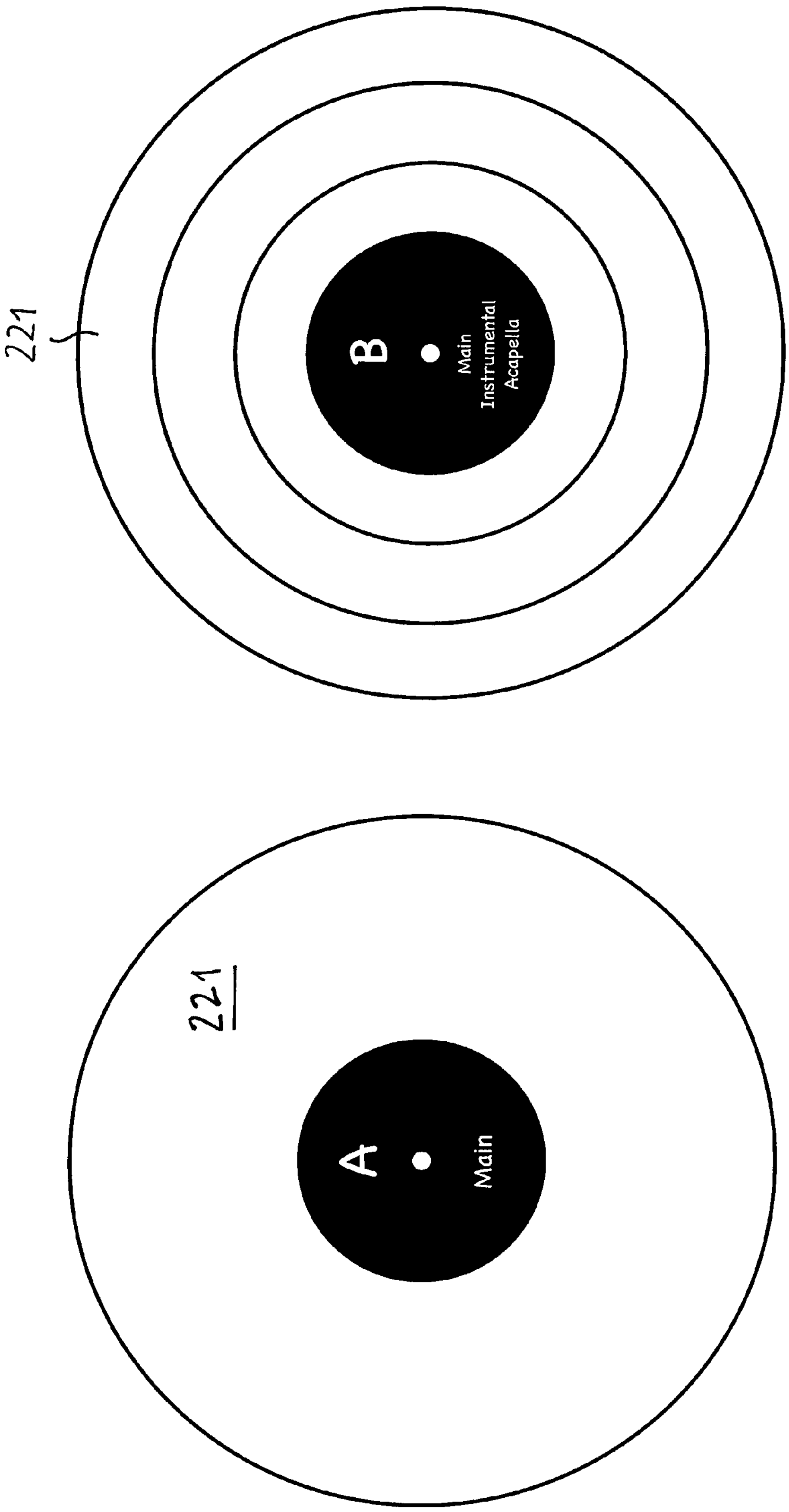
FIG. 5 shows a vinyl-type record according to a fourth embodiment of the present invention.

FIG. 5 shows a vinyl-type record 221 according to a fourth embodiment of the present invention, which may in particular be a vinyl-type record to be used in a system according to the third embodiment of the invention described above with respect to FIG. 4. FIG. 5 shows an A-side of the record 221 on a left side of the figure and B-side of the record 221 on a right side of the figure. A- and B-sides are opposite sides of the same record 221.

In the particular example of FIG. 5, the A-side includes only one region, in which a spiral groove stores a time-code signal and a transport reference signal (either different signals superimposed within the groove, or one signal allowing detection of both a position along the time axis as well as rotation speed and direction). Thus, the A-side may be configured as a normal DVS record. Alternatively, the A-side may include a groove that stores an original version of a piece of music in a conventional, analog manner as analog modulations of the groove. Thus, the A-side of the record may be scanned by a conventional analog turntable and playback of the piece of music may be based on the analog audio signals read out from the record 221.

On the B-side of vinyl-type record 221 different radial regions 228-1, 228-2, 228-3 may be arranged as described previously with respect to the third embodiment and FIG. 4, wherein the grooves contained in these regions 228-1, 228-2 and 228-3 do not store actual audio signals of the piece of music but rather store a region identification signal, which can be read out and interpreted or decoded in digital format to allow identification of the region by computer 240 and thus playback of a specific version among a plurality of different versions of the same piece of music, wherein all these versions are obtained in a digital format from a source that is different from the vinyl-type record 221, in particular from a remote network or from an internal storage device of the computer 240 or an external storage device connected to the computer 240.

The inscribed groove of the vinyl-type record 221 in the third and fourth embodiments may also store a transport reference signal, which may be written superimposed to the region identification signal, such that reading out signals from the groove allows determination of both a region identification information and a transport control information. In addition, a time code signal may be included in the signals stored in the grooves of vinyl-type record 221, which may be superimposed to the region identification signal or both, the region identification signal and the transport control signal. Reading out the time code signal allows the computer 240 to determine the current playback position along time axis T of the pickup device 223 and therefore setting an actual playback position of the digital audio unit, such as to correspond to the current position of the pickup device 223 in radial direction of the record 221, i.e. along time axis T of record 221.

Figure 6:
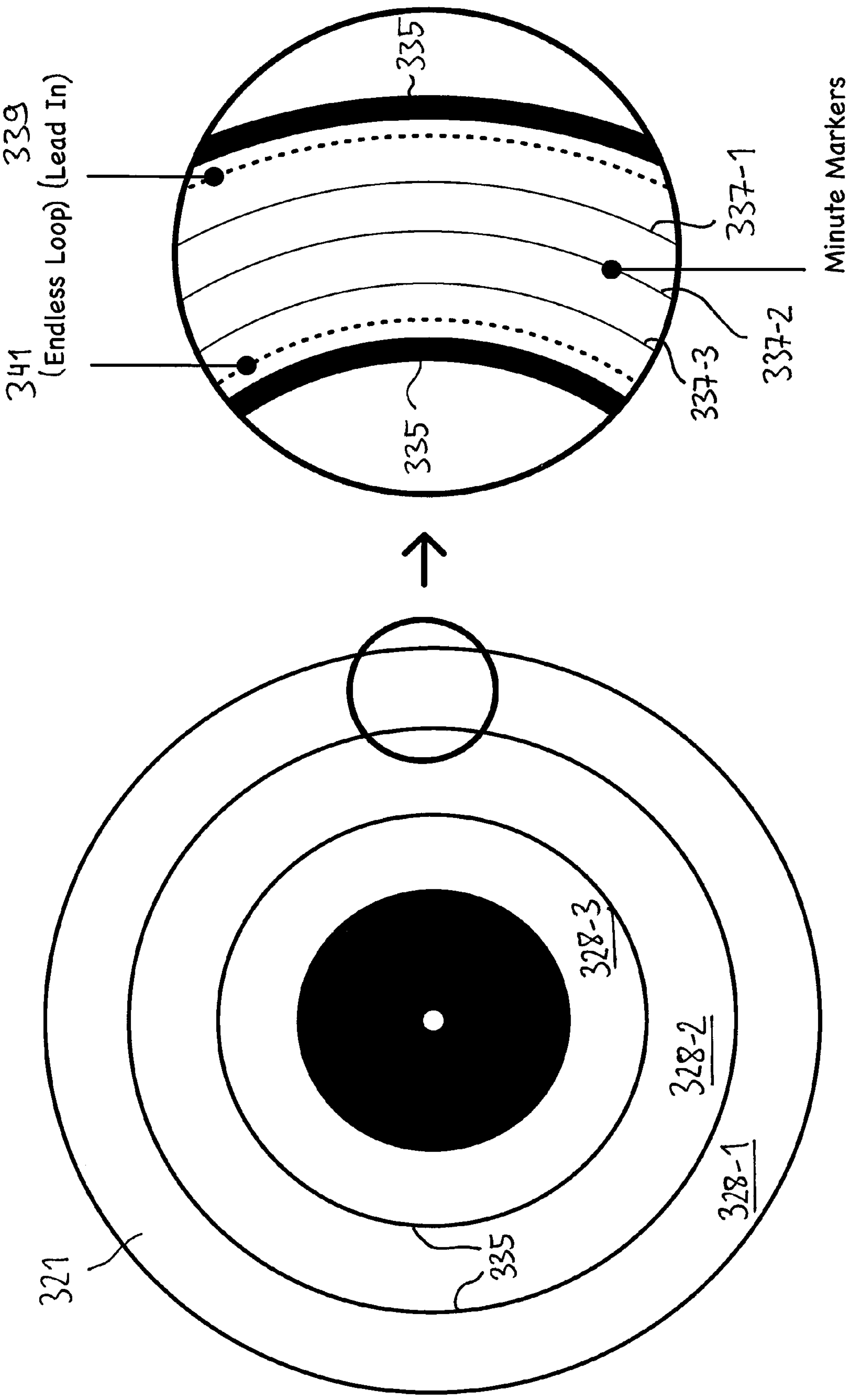
FIG. 6 shows a vinyl-type record according to a fifth embodiment of the present invention.

FIG. 6 shows a fifth embodiment of the present invention, comprising a vinyl-type record 321, for example as described with respect to the third and fourth embodiments above, i.e. comprising a plurality of regions 328-1, 328-2, 328-3 separated from one another by demarcation lines 335. As shown in an enlarged view of the first region 328-1 on the right side of FIG. 6, additional demarcation lines 337-1, 337-2 and 337-3 are provided evenly distributed at positions corresponding to one minute, two minutes, three minutes, etc., along the playback time axis. These additional demarcation lines assist a user in finding a desired playback position within the playback time interval of the current version of the song. Demarcation lines of the vinyl-record 321 therefore assist both selecting a desired region (a version of the song) and moving to a desired playback position.

Furthermore, in at least one region, for example in the first region 328-1, the inscribed groove may be a spiral groove, which starts from a lead-in groove 339 near an outer edge of the region 328-1 and moves radially inwards as the record 321 rotates. Near the inner edge of the region 328-1, the spiral groove runs into an endless circular groove 341, which has a constant radial distance from the center of the record 321. Therefore, when the pickup device following the spiral groove reaches the inner edge of the first region 328-1, the pickup device will be prevented from automatically moving towards the next region 328-2 and the computer is prevented from changing the current version of the piece of music unintentionally. This feature is particularly relevant when the computer is operated in a position-lock mode as described above with respect to the first embodiment, in which the playback position within the current version of the song is independent from the position of the pickup device within the current region, such that there may be cases where the pickup device following the spiral groove has reached the inner edge of the region although the current playback position of the digital audio unit has not yet reached the end of the song.

It should be noted that the specific embodiments described with respect to the drawings use different component tracks to generate different versions of the same piece of music. However, in the sense of the present invention, different versions of the same piece of music (i.e. the same song) may also be obtained by mixing the audio data of the original piece of music with other audio data, such as sounds (white noise, kicks, vocals) or with the audio data of a second piece of music, or (if the second piece contains a mixture of timbres and not just one timbre) with a decomposed component track of the second piece of music, such as only a decomposed drum track or a decomposed vocal track of the second piece of music.

Furthermore, different versions of a piece of music may be obtained by applying acoustic effects or audio effects such as echo, reverberation, modulation, distortion, filtering, time-varying filtering or combinations thereof, changes in the time scale, for example by extending the intro by repeating a portion of the song, increasing or decreasing the pitch of the song without changing its tempo, for example pitch changes by one or multiple semi-tones, tempo changes without changing the pitch, ready-made or auto-generated variations of the song with modified text, for example without offensive vocabulary (explicit/clean versions of a song), etc.

Furthermore, a version of a piece of music in the sense of the present invention can be a so-called rem ix of the piece of music, wherein the piece of music has been modified from its original state. Examples of such remixes are versions that are created such as:

to add, remove, or change portions of the piece of music, wherein a portion can be represented by audio data of any time interval within the duration/length of the piece of music;

to obtain a DJ Edit, which is an adapted version of a track, made to help DJs mix the track easily and creatively with other tracks;

to adapt a piece of music for radio or nightclub play;

to create a stereo or surround sound version of a piece of music;

to improve quality of a piece of music;

to change music genre or character;

to achieve an artistic effect; and/or to trim a piece of music to excise silence or intros, for example.

As mentioned above, according to the present invention, different versions of a piece of music can be already available (it was already produced) and thus simply selected by the digital audio unit from the plurality of versions and read by the digital audio unit from a storage or an internet stream etc. based on the selected region. For example, the different versions of the same piece of music could be streamed on demand from a music distribution portal or streaming service such as Apple Music, Spotify, etc. In a further improved embodiment, multiple versions of the same piece of music may be fetched through search queries to such a streaming service. For example, a plurality of versions of the same piece of music: Artist X—Song Y (original), Song Y (clean edit), Song Y (Techno Remix), and Song Y (Acapella), could be fetch automatically.

Alternatively, different versions of a piece of music can be created by the digital audio unit itself based on the selected region, preferably on the fly or even in real time. Some examples of such versions created directly by the digital audio unit have been described above with respect to the first to fifth embodiments and FIGS. 1 to 6. Another example may be a version of a piece of music achieved by one or more trigger points within the piece of music. A trigger point is any point in time within the duration of the piece of music that has a pointer to a jump position. For example, if the trigger point is at 45 seconds, and the jump position is at 55 seconds, then once the playback position of the piece of music reaches 45 seconds during playback, an automatic jump to playback position 55 seconds is triggered, thus in the audible outcome of the version the section between 45 seconds and 55 seconds is simply removed or cut out. The same could have been achieved in a pre-remix step through an audio editor (e.g. a DAW such as Logic Pro or Ableton Live) by cutting out the part between 45 seconds and 55 seconds.

All of the measures and features described in the present description in relation to obtaining different versions of a piece of music, can be combined with one another in a manner such as to obtain other versions of the same piece of music.

Moreover, in any case, the digital audio data including all different versions of the piece of music as described herein are provided, processed and played back through a digital format.

It should further be noted that digital audio data according to the present invention usually represent stereophonic audio signals and are thus provided in the form of stereo audio files, although other types, such as mono audio files, multichannel audio files, Dolby Atmos or Dolby Surround may be used as well.

The invention claimed is:

1. System for processing digital audio signals, comprising:

a digital audio unit configured to provide digital audio data of at least a first audio track and a second audio track, wherein said digital audio data includes different versions of one and the same piece of music;

a user control device comprising an electronic display device configured to display a graphical representation of a playback time axis and a user input means configured to allow a user to select a first region or a second region along the playback time axis, wherein the first region is associated with a first time interval along a playback time axis, and the second region is associated with a second time interval subsequent to the first time interval along the playback time axis;

and wherein the digital audio unit is configured to play back audio signals obtained from the first audio track, when the first region is selected, and to play back audio signals obtained from the second audio track, when the second region is selected.

2. The system of claim 1, wherein the user control device is further operable by the user to allow the user to select a playback position within the first region or within the second region along the playback time axis, and wherein the digital audio unit is configured to select the first region and set a current playback position for playback of audio signals obtained from the first audio track at the selected playback position, when the selected playback position is within the first region, and to select the second region and set the current playback position for playback of audio signals obtained from the second audio track at the selected playback position, when the selected playback position is within the second region.

3. The system of claim 1, further comprising:

a vinyl-type record; and a turntable adapted to support the record, wherein the digital audio unit is configured to receive control signals from the turntable and/or from reading out the vinyl-type record.

4. The system of claim 3, wherein the user control device comprises user input means configured to allow the user to select the first region or the second region by selecting different radial positions on the vinyl-type record.

5. The system of claim 4, wherein the user input means comprises a control body movable by the user relative to the record such as to approach different radial positions on the vinyl-type record and thereby select either the first region or the second region.

6. The system of claim 5, wherein the control body is a pickup device of the turntable, wherein the pickup device is adapted to scan an inscribed, modulated groove of the record such as to read out signals stored in the groove.

7. The system of claim 3, wherein the vinyl-type record comprises at least one circular demarcation line which is visible for a human eye as separating the first region from the second region.

8. The system of claim 1, wherein a playback duration of the first audio track and a playback duration of the second audio track are equal and substantially correspond to a playback duration of the piece of music.

9. The system of claim 1, wherein the digital audio unit is configured to provide audio data of a mixed track and at least a first component track;

wherein said mixed track is composed from a mixture of source tracks representing different musical timbres, and wherein the first component track is phonetically equal to a first source track of the source tracks of the mixed track; and wherein at least one of the first audio track and the second audio track is obtain based on the first component track.

10. The system of claim 9, wherein the first audio track and the second audio track are each obtained from at least one of the following tracks: the mixed track, the first component track, or a second component track, which is phonetically equal to a second source track of the source tracks of the mixed track; and wherein at least one of the mixed track, the first component track and the second component track is included in the first audio track but not in the second audio track, or is included in the second audio track but not in the first audio track.

11. The system of claim 9, further comprising a decomposition unit, wherein the first component track is a decomposed track generated by the decomposition unit through decomposing the mixed track.

12. The system of claim 11, wherein the decomposition unit includes an artificial intelligence unit which comprises a trained neural network.

13. The system of claim 9, wherein the first component track includes at least one of a vocal track representing a vocal timbre of the piece of music, or an instrumental track representing an instrumental timbre of the piece of music.

14. A system for processing digital audio signals, comprising:

a digital audio unit configured to provide digital audio data of at least a first audio track and a second audio track, wherein said digital audio data includes different versions of one and the same piece of music;

a user control device comprising an electronic display device configured to display a graphical representation of a vinyl-type record, and user input means configured to allow a user to select a first region associated with a first time interval along a playback time axis, or a second region associated with a second time interval subsequent to the first time interval along the playback time axis, by selecting different radial positions on the graphical representation of the vinyl-type record; and wherein the digital audio unit is configured to play back audio signals obtained from the first audio track, when the first region is selected, and to play back audio signals obtained from the second audio track, when the second region is selected.

15. A system for processing digital audio signals, comprising:

a digital audio unit configured to provide digital audio data of at least a first audio track and a second audio track, wherein said digital audio data includes different versions of one and the same piece of music;

a user control device operable by a user to allow the user to select either a first region or a second region, said first region being associated with a first time interval along a playback time axis and the second region being associated with a second time interval subsequent to the first time interval along the playback time axis;

wherein the digital audio unit is configured to play back audio signals obtained from the first audio track, when the first region is selected, and to play back audio signals obtained from the second audio track, when the second region is selected;

a vinyl-type record, which has an inscribed, modulated groove which stores signals, wherein the vinyl-type record, on at least one of its two sides, is partitioned into a plurality of concentric regions, each region being formed by a plurality of continuous groove revolutions, wherein, in at least one of the regions, there is stored a region identification signal, which contains an identification of the region;

a turntable adapted to support the vinyl-type record;

a pickup device which is adapted to scan the groove of the vinyl-type record such as to read out the region identification signal stored in the groove; and a region determination unit configured to determine a currently selected region based on the region identification signal.

16. A system for processing digital audio signals, comprising:

a digital audio unit configured to provide digital audio data of at least a first audio track and a second audio track, wherein said digital audio data includes different versions of one and the same piece of music;

a user control device operable by a user to allow the user to select either a first region or a second region, said first region being associated with a first time interval along a playback time axis and the second region being associated with a second time interval subsequent to the first time interval along the playback time axis;

wherein the digital audio unit is configured to play back audio signals obtained from the first audio track, when the first region is selected, and to play back audio signals obtained from the second audio track, when the second region is selected;

a vinyl-type record;

a turntable adapted to support the vinyl-type record; and a transport determination unit configured to determine a transport parameter of the turntable, wherein the transport parameter corresponds to at least one of a rotation direction and a rotation speed of the vinyl-type record, wherein the digital audio unit is configured to modify play back of the audio signals based on the transport parameter.

17. The system of claim 16, wherein the vinyl-type record has an inscribed, modulated groove which stores a transport reference signal;

wherein the system further comprises a pickup device which is adapted to scan the groove of the record such as to read out the transport reference signal; and wherein the transport determination unit is configured to determine the transport parameter based on the transport reference signal.

18. A system for processing digital audio signals, comprising:

a digital audio unit configured to provide digital audio data of at least a first audio track and a second audio track, wherein said digital audio data includes different versions of one and the same piece of music;

a user control device operable by a user to allow the user to select either a first region or a second region, said first region being associated with a first time interval along a playback time axis and the second region being associated with a second time interval subsequent to the first time interval along the playback time axis;

wherein the digital audio unit is configured to play back audio signals obtained from the first audio track, when the first region is selected, and to play back audio signals obtained from the second audio track, when the second region is selected;

a vinyl-type record;

a turntable adapted to support the vinyl-type record; and a position determination unit configured to determine a current turntable playback position associated to the turntable, wherein the digital audio unit is configured to play back the audio signals obtained from the first or second audio track at a playback position along the playback time axis which corresponds to the turntable playback position.

19. The system of claim 18 wherein the vinyl-type record has an inscribed, modulated groove which stores a time-code signal representing a position along the length of the groove;

wherein the system further comprises a pickup device which is adapted to scan the groove of the record such as to read out the time-code signal; and wherein the position determination unit is configured to determine the turntable playback position based on the time-code signal.

20. A system for processing digital audio signals, comprising:

a digital audio unit configured to provide digital audio data of at least a first audio track and a second audio track, wherein said digital audio data includes different versions of one and the same piece of music;

a user control device operable by a user to allow the user to select either a first region or a second region, said first region being associated with a first time interval along a playback time axis and the second region being associated with a second time interval subsequent to the first time interval along the playback time axis;

wherein the digital audio unit is configured to play back audio signals obtained from the first audio track, when the first region is selected, and to play back audio signals obtained from the second audio track, when the second region is selected;

a region changing unit configured to detect a region change operation initiated by the user operating the user control device to change the selected region from a current region associated to a current track out of the first and second track to a next region associated to a next track out of the first and second track;

wherein the region changing unit, upon detection of the region change operation, is configured to stop playback of the current track and to start playback of the next track; and wherein a playback position within the next track at which playback of the next track is started is chosen based on the playback position within the current track at which playback is stopped.

21. The system of claim 20, wherein if $t1$ is the playback position within the current track at which playback of the current track is stopped, $T1$ is a total playback duration of the current track, $t2$ is the playback position within the next track at which playback of the next track is started, and $T2$ is the total playback duration of the next track, then $t1/T1=t2/T2$ holds.

22. A system for processing digital audio signals, comprising:

a digital audio unit configured to provide digital audio data of at least a first audio track and a second audio track, wherein said digital audio data includes different versions of one and the same piece of music;

a user control device operable by a user to allow the user to select either a first region or a second region, said first region being associated with a first time interval along a playback time axis and the second region being associated with a second time interval subsequent to the first time interval along the playback time axis;

wherein the digital audio unit is configured to play back audio signals obtained from the first audio track, when the first region is selected, and to play back audio signals obtained from the second audio track, when the second region is selected;

a vinyl-type record having an inscribed, modulated groove which stores signals, said groove being configured to be scanned by a pickup device of a turntable in order to read out the signals, wherein the vinyl-type record, on at least one of its two sides, is partitioned into a plurality of concentric regions, each region being formed by a plurality of continuous groove revolutions, and wherein, in at least one of the regions, there is stored a region identification signal, which contains an identification of the region;

a turntable adapted to support the vinyl-type record; and a pickup device which is adapted to scan the groove of the vinyl-type record such as to read out signals stored in the groove, wherein the digital audio unit is configured to receive control signals from the turntable and/or from reading out the vinyl-type record.

* * * * *